(12) United States Patent
Gray

(10) Patent No.: US 6,830,374 B1
(45) Date of Patent: Dec. 14, 2004

(54) METALLURGICAL THERMOCOUPLE

(75) Inventor: Adrian L Gray, Kwa-Zulu Natal (ZA)

(73) Assignee: Temperature Management Systems (Proprietary) Limited, Richard Bay (ZA)

( * ) Notice: Subject to any disclaimer, the term of this patent is extended or adjusted under 35 U.S.C. 154(b) by 0 days.

(21) Appl. No.: 10/069,037

(22) PCT Filed: Aug. 16, 2000

(86) PCT No.: PCT/ZA00/00136
§ 371 (c)(1),
(2), (4) Date: Feb. 15, 2002

(87) PCT Pub. No.: WO01/13438
PCT Pub. Date: Feb. 22, 2001

(30) Foreign Application Priority Data

Aug. 16, 1999 (ZA) .................................................. 99/5203

(51) Int. Cl.[7] ........................... H01L 35/22; H01L 35/24; G01K 7/06
(52) U.S. Cl. .......................... 374/179; 374/208; 136/230
(58) Field of Search ................................ 374/179, 139, 374/208; 136/225, 226, 230, 234, 232

(56) References Cited

U.S. PATENT DOCUMENTS

| | | | | |
|---|---|---|---|---|
| 2,074,777 A | * | 3/1937 | Coupier | |
| 2,351,056 A | * | 6/1944 | Lepetit | |
| 2,800,524 A | * | 7/1957 | Van Lear | |
| 3,205,296 A | * | 9/1965 | Davis et al. | |
| 3,297,818 A | * | 1/1967 | McCleery | |
| 3,634,190 A |   | 1/1972 | Kilp et al. | 176/67 |
| 3,647,558 A | * | 3/1972 | McMurphy | |
| 3,789,130 A | * | 1/1974 | Parker | 174/115 |
| 3,833,387 A |   | 9/1974 | Reed et al. | 106/49 |
| 4,356,271 A | * | 10/1982 | Francis et al. | 501/84 |
| 4,426,457 A |   | 1/1984 | Zhukov et al. | 501/128 |
| 4,721,533 A | * | 1/1988 | Phillippi et al. | 136/234 |
| 4,732,619 A |   | 3/1988 | Nanigian | 136/228 |
| 4,829,029 A | * | 5/1989 | Kawahara et al. | 501/108 |
| 5,030,294 A | * | 7/1991 | Burley | 136/232 |
| 5,043,023 A | * | 8/1991 | Bentley | 136/232 |
| 5,111,002 A | * | 5/1992 | Hollander | 136/230 |
| 5,141,335 A | * | 8/1992 | Wannamaker et al. | 374/165 |
| 5,173,455 A | * | 12/1992 | Terbot et al. | 501/12 |
| 5,197,805 A | * | 3/1993 | Wilson | 374/208 |
| 5,220,130 A | * | 6/1993 | Walters | 174/36 |
| 5,242,226 A | * | 9/1993 | Ross et al. | 374/208 |
| 5,275,488 A | * | 1/1994 | Stelts | 374/140 |
| 5,360,662 A | * | 11/1994 | Wong | 428/293.4 |
| 5,464,485 A | * | 11/1995 | Hall, Jr. | 136/230 |
| 5,520,461 A | * | 5/1996 | Curry et al. | 374/179 |
| 5,682,018 A | * | 10/1997 | Wen et al. | 174/257 |
| 6,180,889 B1 | * | 1/2001 | Bul | 174/121 R |
| 6,190,038 B1 | * | 2/2001 | Kita et al. | 374/140 |
| 6,239,351 B1 | * | 5/2001 | Hall, Jr. | 136/227 |
| 2002/0001334 A1 | * | 1/2002 | Kita | 374/140 |
| 2004/0053770 A1 | * | 3/2004 | Nenasheva et al. | 501/134 |

FOREIGN PATENT DOCUMENTS

| | | | | |
|---|---|---|---|---|
| AU | 9712601 A | * | 2/1997 | ............ H05B/3/18 |
| EP | 0292095 A1 | * | 11/1988 | ............ C22C/19/05 |
| EP | 0314807 A1 | * | 11/1988 | ............ C04B/35/58 |
| FR | 2590980 A1 | * | 12/1985 | ............ G01K/7/04 |
| JP | 63082329 |   | 4/1988 | ............ G01K/1/08 |
| JP | 08073212 |   | 3/1996 | ............ C01B/35/10 |

OTHER PUBLICATIONS

Jau–Ho Jean, T.K. Gupta: "Liquid phase sintering in the glass–cordierite system" Journal of Material Science, vol. 27, No. 6, Mar. 15, 1992, pp. 1575–1584, XP000960820.

* cited by examiner

Primary Examiner—Gail Verbitsky
(74) Attorney, Agent, or Firm—Darby & Darby

(57) ABSTRACT

This invention concerns a thermocouple which is protected by an outer sheath comprising inner and outer tubes with the annular space filled with low temperature sintering refractory material which is preferably beaded before filling in the space and in which the outer tube is constricted to compact the material. The refractory material will include borosilicate and boric acid powder.

2 Claims, 1 Drawing Sheet

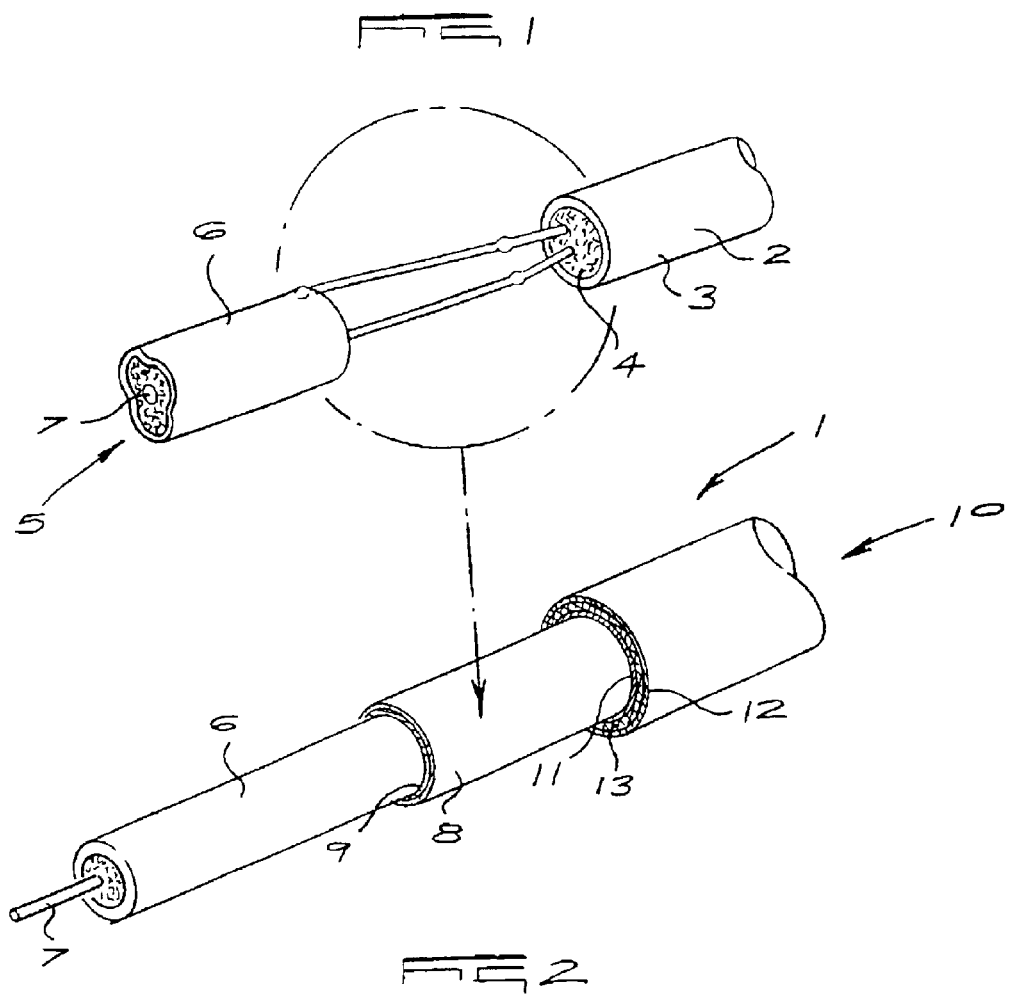
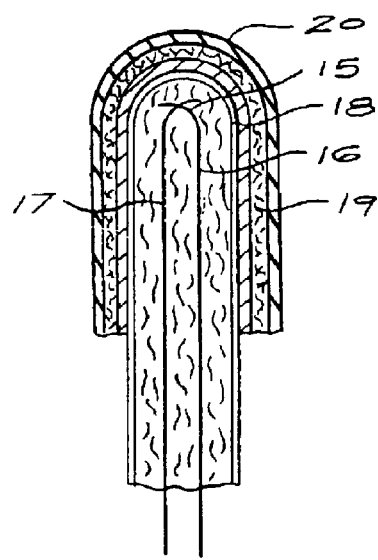

METALLURGICAL THERMOCOUPLE

FIELD OF THE INVENTION

This invention relates to thermocouples and more particularly to thermocouples for use in determining the temperature of molten metals.

BACKGROUND TO THE INVENTION

Many kinds of thermocouples have been designed and used for use in the metallurgical industry. In general in the melting and casting processes for the production of primary and secondary aluminium the use of so called "Marshall Tip Thermocouple" has become fairly standard practice. In the baking process of carbon anodes for the production of aluminium the use of wire and bead or mineral insulated thermocouples protected by suitable metallic sheaths has become the norm.

In the ferrous metal industry platinum rhodium type thermocouples are used because the temperatures of molten steel are generally greater than those at which some of the components of the thermocouple used in the non-ferrous industry melt. It is difficult to provide insulation of the platinum rhodium element at molten steel temperatures for any length of time and insulation which will enable repeated use of the thermocouple is also difficult to provide. Consequently in the interests of economy, the thermocouple for this industry has been designed to protect the thermoelement for a maximum of about 4 seconds of immersion time, which is sufficient to obtain a single measurement.

Such thermocouples incorporate the smallest amount of the required materials, and where practical, the lowest cost materials in order to render the device expendable after only a single immersion into molten iron or steel.

Thus with an overriding cost consideration different thermocouples have been developed to meet the particular requirements of particular applications.

There remains however the basic requirements for all thermocouples which is the integrity of the temperature measurement obtained. To achieve this it is necessary that the measuring probe be protected against electrical conductivity of its immediate protection material and further that a barrier of sufficient mechanical strength be provided against the inherently corrosive attack from the in situ environment in which the thermocouple is to be used.

OBJECT OF THE INVENTION

As stated the kind of thermocouple used in any application is driven by cost effectiveness. All of the thermocouples referred to suffer some or other disadvantage as a result of cost and it is the object of the present invention to provide a thermocouple which with minor modification can be used in the ferrous and non-ferrous industries and which can be made at a high cost effectiveness.

SUMMARY OF THE INVENTION

According to this invention there is provided a thermocouple comprising a sensing tip and electrical connection with a mineral insulated thermocouple cable characterised in that the shielding is provided by a low temperature sintering refractory material.

Further features of this invention provide for the thermocouple cable to be types K and N for non-ferrous metals or type W, W3, W5 and molybdenum rhenium for ferrous metals.

Still further features of this invention provide for the shielding to be in the form of a sheath having inner and outer metal tubes over a filler of low temperature sintering refractory material and for the tubes to be drawn down, swaged or rolled to compact the filler between them and for a conventional binder material to be added to the refractory material to give it the required green strength when the refractory material is beaded before introduction between the tubes.

The invention also provides for the refractory material to include particulate borosilicate and boric acid powder, for the borosilicate to comprise between 6% by weight of the total refractory material, for the boric acid to comprise about 3% to 5% by weight of the total refractory material and for the boric acid content of the refractory material to be about one half that of the borosilicate content.

Still further features of this invention provide for the inner and outer tubes of the sheath to be of stainless steel.

The invention provides a method of shielding a thermocouple comprising locating beads of suitably bound refractory material between an inner metal tube and an outer metal tube and reducing the sheath down to a predetermined size by drawing swaging or rolling during which process the beaded refractory material is compacted between the inner tube and the outer tube.

A further feature of this method provides for the reduced sheath to be subsequently annealed and the refractory material to be at least partially sintered simultaneously with the annealing of the sheath.

Yet further features of this invention provide for the tip to be provided by the dissimilar metal wires of the mineral insulated thermocouple cables providing a hot junction for the thermocouple with the wires embedded in magnesium oxide and this latter supported by a sheath as above defined or by a tube of the same metal as one wire of the cable housing the other wire of the cable to form the thermocouple tip with the wire embedded in a low sintering refractory material.

It is to be understood that where reference is made to metal tubes or wires of thermocouple cable materials being negative and positive Type K or Type W metals this polarity may be reversed. Further the terms "shield" and "shielding" are used to signify both thermal and electrical insulation.

BRIEF DESCRIPTION OF THE DRAWINGS

A preferred embodiment of this invention is described below with reference to the accompanying drawing in which FIG. 1 is an oblique view of one form of thermocouple; and FIG. 2 is a section through the tip of an alternative form of thermocouple.

DETAILED DESCRIPTION WITH REFERENCE TO THE DRAWINGS

As illustrated the thermocouple (1) is made from a length of conventional mineral insulated thermocouple cable (2). This comprises an outer casing (3) of stainless steel around a magnesium oxide insulating body (4). The thermocouple is a Type K thermocouple connected to an operating tip (5) having the negative wire welded to a negative Type K tube (6) which extends around the extended Type K positive wire (7). A low temperature sintering refractory material (8) is packed in the tube (6) around the wire (7).

As mentioned above the Type K tube may form the positive connection and the wire the negative connection for the thermocouple tip.

The connection between the mineral insulated thermocouple cable (2) and the thermocouple tip (5) is located within a suitable metallic oversleeve (8) having further low sintering refractory insulation (9) around the cable (2) and tip (5) and within the oversleeve (8).

To provide sufficient physical strength as well as further insulation a sheath (10) having inner and outer tubes (11) and (12) is provided. The annular space between tubes (11) and (12) is first packed with beaded low temperature sintering refractory (13). The outer tube is then drawn down over the refractory material crushing the beads to reduce the porosity and also increasing the physical green strength of the sheath.

The outer tube may be annealed after the drawing operation and the refractory material at least partially sintered during this annealing process. It has been found advantageous to pre-dry the refractory material before use to a temperature of between 135° and 150° C.

This material may be sintered during in situ use but is preferably at least partially presintered by heating before use and maintained under conditions mitigating the ingress of moisture.

It has been found that a very suitable refractory material can be obtained by the addition of crushed borosilicate and boric acid powder in a proportion by weight of about 2 to 1 to any refractory material. Preferably the borosilicate will comprise between 6% and 10% of the weight of the composite refractory material, most preferably about 8%. The applicant has found that this mixture precipitates a reaction at only ±780° C. which is very similar to that of conventional sintering in which the surface of the aggregate particles soften and the particles fuse together to form a more dense mass. It is assumed that the borosilicate, which has a melting point of about 780° C., provides the soft surface on each particle, but only in the presence of boric acid. Once formed, it no longer melts at the same temperature. The result is a dense body that does not lose its bond even at temperatures in excess of 1000° C.

Once sintered, the ingress of atmospheric moisture, which must occur because it is still porous, appears to have no effect on the electrical conductivity of such a body. This is a decided advantage in the manufacture of thermocouples where the electrical insulation of conductors at elevated temperatures has always represented a significant problem.

This thermocouple responds instantly when immersed into molten metal, or any electrically conductive compound which bridges the two conductor ends. This provides temperature measurement of liquids as well as for solids to be obtained with the same thermocouple.

It will be appreciated that the thermocouple can be made in an acceptably cost effective manner.

The thermocouple above described is that which will be used for non-ferrous metals. For ferrous metals the Type W or molybdenum rhenium thermocouple cable and tip will be used.

FIG. 2 illustrates an alternative form of thermocouple.

In this form the hot junction (15) is formed by baring the ends of the wires (16) (17) of the thermocouple and fitting a cap (18) over this junction. The end of the cable is inserted through the sheath (19) which has its end shaped to close together to form an outer cap (20) from the outer tube, a continuous layer of low temperature sintering refractory material and the closed inner tube.

This thermocouple may be satisfactorily used where instantaneous temperatures are not necessary and they can be used to obtain continuous temperature measurements. Even should the outer tube become eroded shielding is still afforded by the sintered refractory material.

Thermocouples for both ferrous and non-ferrous material can thus be provided with a high degree of shielding for both instantaneous and continuous temperature recordings.

What is claimed is:

1. A thermocouple comprising a sensing tip in electrical connection with a mineral insulated thermocouple cable characterized in that additional external shielding is provided by a low temperature sintering refractory material including particulate borosilicate and boric acid power, in which the tip is formed from a thermocouple cable with a negative metal tube housing a positive wire embedded in the low temperature sintering material.

2. A thermocouple comprising a sensing tip in electrical connection with a mineral insulated thermocouple cable characterized in that additional external shielding is provided by a low temperature sintering refractory material including particulate borosilicate and boric acid power, the shielding is in the form of a sheath having inner and outer metal tubes constricted over a filler of low temperature sintering refractory material, in which the tip is formed by providing a hot junction from the wires of the thermocouple cable and supported by the sheath with both tubes and the refractory material formed to cap the hot junction.

* * * * *